United States Patent [19]

Strepparola et al.

[11] Patent Number: 4,746,550
[45] Date of Patent: May 24, 1988

[54] USE OF PERFLUOROPOLYETHER DERIVATIVES FOR PROTECTING STONE MATERIALS FROM ATMOSPHERIC AGENTS

[75] Inventors: Ezio Strepparola, Bergamo; Gerardo Caporiccio; Adolfo Pasetti, both of Milan; Franco Piacenti, Florence, all of Italy

[73] Assignees: Ausimont S.p.A., Milan; Centro Nazionale Della Ricerche, Rome, both of Italy

[21] Appl. No.: 910,659

[22] Filed: Sep. 23, 1986

[30] Foreign Application Priority Data

Sep. 24, 1985 [IT] Italy ............................ 22258 A/85

[51] Int. Cl.$^4$ ............................................. B05D 3/02
[52] U.S. Cl. ............................ 427/385.5; 427/393; 427/393.6; 428/422
[58] Field of Search ............ 252/67; 427/385.5, 393.6, 427/393; 428/422

[56] References Cited

U.S. PATENT DOCUMENTS

| | | | |
|---|---|---|---|
| 3,665,041 | 5/1972 | Sianesi et al. | 252/67 |
| 4,125,673 | 11/1978 | Roth et al. | 427/393.6 |
| 4,131,711 | 12/1978 | Attwood | 427/393.6 |
| 4,167,605 | 9/1979 | Attwood et al. | 427/393.6 |
| 4,208,466 | 6/1980 | Szur | 427/393.6 |
| 4,453,991 | 6/1984 | Grot | 427/393.6 |
| 4,499,146 | 2/1985 | Piacenti et al. | 428/540 |

*Primary Examiner*—Thurman K. Page
*Assistant Examiner*—L. R. Horne
*Attorney, Agent, or Firm*—Stevens, Davis, Miller & Mosher

[57] ABSTRACT

A process for protecting marble, stones, tiles, cement and similar materials from the action of atmospheric and polluting agents, by applying a perfluropolyether to the surface of the manufactured article, characterized by using a perfluoropolyether having at one or at both ends functional groups capable of acting as anchoring agents for the substrate.

4 Claims, No Drawings

USE OF PERFLUOROPOLYETHER DERIVATIVES FOR PROTECTING STONE MATERIALS FROM ATMOSPHERIC AGENTS

It is known that the perfluoropolyethers impart a marked water-repellent property to the surface of the material to which they are applied.

Furthermore, the perfluoropolyethers exhibit a high Bunsen coefficient for the gas components of air and therefore permit a good passage of the air through the surface of the treated materials.

These properties render the perfluoropolyethers interesting as liquids adapted to protect stoneworks and, in general, articles constructed with stones, marble, cement, tiles, gypsum or wood, from atmospheric agents. Such action is all the more desirable as the protection is reversible because it is based on the deposition of a thin liquid film onto the surface of the article, such film being adapted also to be later removed, if necessary or desired.

Furthermore, the low index of refraction of the perfluoropolyethers, which corresponds to a value of about 1.3 measured at 20° C. with the light of a sodium lamp, causes the manufactured article to retain its original appearance, avoiding optical interference phenomena which lead to color alterations.

The aforesaid use of perfluoropolyethers has been described in an earlier Italian patent application No. 19,933 A/81, filed on Feb. 24, 1981.

The perfluoropolyethers disclosed in the above-cited art were of the type with end groups, consisting of perfluoroalkyl groups.

It was observed that the presence of porosity in the material to be protected leads to a phenomenon consisting in a slow absorption of the type of perfluoropolyethers utilized so far, such phenomenon causing a more or less slow migration (as a function of the type of porosity of the material) of the protecting liquid towards the innermost layers of the article. The consequence thereof is a lesser effectiveness in time of protection of the outermost areas of the treated article. While on certain particular materials, such as for example sandstones, such effect of migration towards the inside is sufficiently slow as to provide stability of protection over a long period of time, in other cases (for example tiles) such phenomenon gives rise to a decrease in the surface-protecting action, so that further surface treatments become necessary in a relatively shorter time, it being understood that the protection of the underlying layers still remains sufficiently great as to considerably slow down the undesired alteration phenomena.

It has now been found that it is possible to obtain a permanent protective action on the above-mentioned materials if perfluoropolyethereal derivatives with functional end groups capable of forming chemical and/or physical bonds with the substrate are utilized as protecting agents or as coadjuvants.

Such functionalized end groups become fixed to the substrate to be protected, thus reducing the mobility of the perfluoropolyethers and increasing the duration of their protective effect on the treated surface.

Depending on the type of bond formed with the substrate, it is either possible or not possible, at a later time, to remove the protecting agent, if so desired, by solubilization in an appropriate solvent, such as e.g. mixtures of 1,1,2-trichloro-1,1,2-trifluoroethane/acetone (or methanol), in a ratio varying from 1/1 to 4/1 by volume.

The other characteristics of use of these functionalized perfluoropolyethereal fluids remain analogous with those of the perfluoropolyethers indicated in Italian patent application No. 19,933 A/81. See also Italian patent application No. 19,628, filed Feb. 22, 1985.

In particular, such fluids exhibit:

(1) a capability for creating a thin protective layer having a low volatility and being resistant to the most aggressive chemical agents, such as e.g. acids and alkalies, this resulting in a high resistance to the atmosphere and to the pollutants therein:

(2) a high thermal stability with retention of the fluid state even at a low values of ambient temperature;

(3) low surface tension;

(4) a high water-repellency;

(5) a high oil-repellency;

(6) permeability to air and to water vapor; and (7) resistance to ligh radiations, and in particular, to U.V. radiations.

More particularly, the perfluoropolyethers useful for a permanent protective action according to the present invention belong to one of the following groups;

(I) $Rf-O(C_3F_6O)_m (CFXO)_n-CFX-Y-Zp$ wherein Rf is a perfluoroalkyl group with 1 to 3 carbon atoms; $(C_3F_6O)$ and (CFXO) are oxyperfluoroalkylene units statistically distributed along the chain, and $X=F$ or $CF_3$; m and n are integers or $n=0$ (m is always $\neq 0$) and m/n varies from 5 to 40 when $n \neq 0$;

p may be 1 or 2;

the mean molecular weight varying from 500 to 10,000, and preferably from 900 to 6,000);

Y is a divalent or trivalent organic linking radical;

Z is a functional group capable of forming a chemical and/or physical bond with the above-mentioned material to be protected and is selected from:

Z(1) a non-aromatic, non-fluorinated organic radical, free from active hydrogen atoms, containing two or more electron doublets-donor heteroatoms, or an aromatic radical, either containing or not containing heteroatoms, capable of giving rise to coordinate bonds or to charge transfer bonds, thus causing various kinds of adsorption phenomena on the substrate;

$Z(2)-CONR^2R^3, -COOR$

R is H or an alkyl group with 1 to 8 carbon atoms, either aromatic or alkylaromatic such as benzyl, the aromatic groups being capable of containing, as substituents, alkyl or polyethoxy groups, $R^2$ and $R^3$ are H or an alkyl group containing 1 to 8 carbon atoms or a substituted phenyl group;

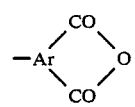

where Ar is an aromatic group;

—OH;

—NCO,

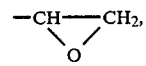

—NHR, —COR, —SiR$_t$(OR)$_{3-t}$ with t varying from 0 to 2 and R is the same as defined hereinbefore;

Z(3) a group containing unsaturations of the ethylenic polymerizable type;

Z(4) a radical of class Z(1) containing one or more of the substituents indicated in class Z(2).

(II) AO—(C$_2$F$_4$O)$_p$(CF$_2$O)$_q$—A′ where the unit (C$_2$F$_4$O) and the unit (CF$_2$O) are statistically distributed along the chain;

p and q are integers such that p/q may vary from 5 to 0.3 and preferably from 2.5 to 0.7;

A′ is —CFX—Y—Zp;

A is A′ or a perfluoroalkyl with 1 to 3 carbon atoms;

p, X, Y and Z are the same as defined hereinabove;

the mean molecular weight varying from 1,000 to 20,000, and preferably from 1,800 to 8,000.

(III) Perfluoropolyethereal compounds containing the units (C$_3$F$_6$O), (C$_2$F$_4$O) and (CFXO) statistically distributed along the chain with the indicated end groups A and A′ as specified hereinbefore, and having a molecular weight ranging from 500 to 20,000.

(IV) Difunctional or monofunctional perfluoropolyethereal compounds comprising the units:

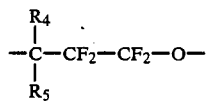

where R$_4$ and R$_5$ may be like or unlike each other and are selected from H, Cl, F, said units being statistically distributed along the polymer chain; having a mean molecular weight ranging from 1,500 to 8,000; and wherein a fluorine atom of the perfluoromethylene units may be substituted by H, Cl or by perfluoroalkoxyl or perfluoroalkyl.

The above indicated end groups Z of class Z(1) are described in detail in Italian patent applications Nos. 21480 A/84 and 21481 A/84. Those of class Z(3) in particular are selected from methacrylic, acrylic, cinnamic, vinyl, allyl, vinyl- or allyl-ether groups. Group Y may be for example —CH$_2$O—, —CH$_2$—O—CH$_2$—, —CH$_2$(OCH$_2$CH$_2$)$_g$—(g being an integer from 1 to 3), —CH$_2$—, —CF$_2$O—, —CH$_2$—, —CONR—, —COO—, —COS—, —CO—, —CH$_2$NR—, —CH$_2$S—, where R is the same as defined hereinabove. Other linking groups Y are described in U.S. Pat. No. 4,094,911 as radicals X or Y. The starting compounds for obtaining monofunctional perfluoropolyethers of class IV are for example:

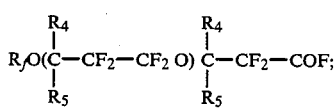

for obtaining the difunctional perfluoropolyethers they are for example:

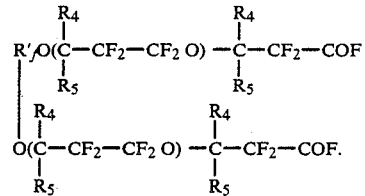

in which R$_f$ and R′$_f$ are monovalent and divalent fluoroalkyl radicals, respectively.

From the abovesaid compounds, end group COF may be converted for example into end groups Y-Z indicated in classes Z (1) or Z (2). The functionalized products of class (IV) are preparable according to the methods specified in published European patent application No. 148,482.

The above-cited applications are incorporated by reference into the present application.

It is to be understood that the difunctional products of classes II, III and IV indicated hereinabove may also be utilized in the form of their polycondensation products to provide, for example, polyurethanes, polyureas, polyesters, polyamides, polyethers, polyimides, polyaminic acids.

When starting from a difunctional product with end groups —OH, a diisocyanate is used, or vice-versa. The polycondensation reaction may be carried out by using the fluorinated difunctional products of the present invention, or a difunctional compound of the present invention and a hydrogenated partner.

In like manner the other polycondensation products are obtained, as well known in the art, as described in U.S. Pat. No. 4,080,319 for the polyamides, in U.S. Pat. No. 3,876,617 for the polyamides, and in general in U.S. Pat. No. 3,810,874. If end groups Z of class Z(3) are utilized, then it is possible to use both monofunctional and difunctional products of classes I, II, III, IV.

The utilization of the polymeric products is particularly suitable when a consolidating effect for the substrate is to be obtained. It is possible also to use copolymers obtained by starting from the fluorinated monomers of the present invention with hydrogenated comonomers, or vice-versa, as well as polymers obtained by polycondensation.

Said polymeric products may be applied to the substrate to be protected in the form of solutions in case said polymeric products should be soluble products (linear polymers), otherwise it is possible to carry out a polymerization in situ on the substrate starting from the starting monomeric products, optionally in solution.

The compounds of classes I, II, III and IV may be used as such or dissolved in fluorocarbons or fluorochlorocarbon, having boiling points preferably not higher than 80° C. Furthermore they may be used in admixture with perfluoropolyethers with end groups of the inert type, having one of the following structures V, VI, VII:

(V) Rf—O—(C$_3$F$_6$O)$_m$(CFXO)$_n$—Rf′ where (C$_3$F$_6$O) and (CFXO) are units statistically distributed along the chain;

Rf′ may be like or different from Rf and both consist of groups CF$_3$, C$_2$F$_5$, C$_3$F$_7$;

X=F or CF$_3$;

m and n are integers;

when n=0, Rf and Rf′ are C$_2$F$_5$ or C$_3$F$_7$;

when n≠0, the m/n ratio varies from 5 to 40;

the mean molecular weight varies from 4,000 to 10,000.

(VI) $CF_3-(C_2F_4O)_p(CF_2O)_qCF_3$
where units $(C_2F_4O)$ and $(CF_2O)$ are statistically distributed along the chain and p and q are the same as defined hereinabove;
the mean molecular weight varies from 4,000 to 16,000.

(VII) A perfluoropolyether containing repeating units: $-(CF_2CF_2CF_2O)-$ having a molecular weight ranging from 4,000 to 16,000, the end groups being a perfluoroalkyl group or a perfluoroaryl group.

Such products can be prepared, for example, according to published European patent application No. 148,482. The repeating units of class VII may also contain, instead of F, perfluoroalkyls or prefluoroalkoxyls, as indicated above in class IV.

The weight ratio between the compounds with functionalized end groups of type I, II, III or IV and the compounds with neutral end groups of type V, VI, VII, expressed as I+II+III+IV/V+VI+VII, is equal to or higher than 0.01.

As inert perfluoropolyethers it is possible also to use corresponding copolymers of class III.

The application of products I, II, III and IV either in the presence or absence of products V, VI and VII is preferably accomplished in a solution of 1,1,2-trifluorotrichloroethane at 50 to 80% by weight in perfluoropolyethereal products, and it may be carried out by spraying an atomised liquid jet with or without compressed air, or by any other convenient method.

By the process of the present invention it is possible to obtain a better protection of works and articles made of stones, marble, cement, gypsum and wood as compared with the use of the perfluoropolyethers as described in Italian patent application No. 19,933 A/81. Such better protection is achieved by the use of products having a telomer structure containing a chain of the perfluoropolyethereal type similar to that claimed in the above-cited patent application and having functional end groups capable of exerting an anchoring action on the surface of the manufactured article, thus rendering the surface protecting action more stable and more protective in the long run.

The amount of protective perfluoropolyethereal agent to be used may vary widely depending on the nature of the material to be treated, and in particular on its porosity. The amounts may be even lower than 10 g/m² for very compact materials such as Carrara marble, and may increase up to 300 g/m² and above for very porous materials.

The following examples are given merely for illustrative purposes and are not to be considered as a limitation of the possible embodiments when mixtures with perfluoropolyethers having neutral (inert) end groups are utilized.

EXAMPLE 1

There were utilized two test-pieces of Carrara marble having the same composition, a porosity lower than 1% and a cubic shape, the side measuring 50 mm.

One of the test-pieces was treated on its surface with a derivative of a perfluoropolyether of type II provided with piperonyl end groups linked to the perfluoropolyethereal chain through radical $-CH_2O-$ and X in the group $-CFX-$ was equal to F, having a mean molecular weight of 2,300, and prepared according to Example 1 of Italian patent application No. 21481 A/84.

The piperonyl derivative of the perfluoropolyether was applied by using a solution in 1,1,2-trichlorotrifluoroethane at 5%, such solution having been appled by means of a compressed-air sprayer in order to insure that an amount of protective fluid equal to 30 g/m² should be deposited onto the test-piece surface. On the two test-pieces, the amount of water absorbed with time was measured after seven days. Such measurement was effected by appling to a face of each test-piece an apparatus consisting of a glass cylinder filled with water and connected to a graduated microburette which permitted one to measure the amount of water absorbed by the contact surface of the test-piece. Said apparatus is described in detail in the document published by the group Unesco-Rilem PEM, No. 78/182. The reading of the absorbed water was made at predetermined intervals of time and the amounts indicated are expressed in microliters/cm² of surface.

In the treated test-piece, the water absorbed per cm² was practically equal to zero up to 30 minutes; in the non-treated test-piece, the absorbed amounts were, conversely, 1.5 after 10 minutes, 4.6 after 20 minutes, and 7.6 after 30 minutes (expressed in microliters per cm²).

From a comparison of the two test-pieces it is apparent that the surface treatment with the protective agent strongly reduced the rate of the water penetration into the stone.

EXAMPLE 2

Two Carrara marble test-pieces having a cubic shape, with the side measuring 5 cm, were respectively treated, on one face only, with:

test-piece 1
perfluoropolyether "Fomblin Met" manufactured by Montefluos S.p.A., Milan, in an amount equal to 30 g/m². "Fomblin Met" is a mixture of 30 parts by weight of 1,1,2-trichlorotrifluoroethane and of 70 parts by weight of Fomblin YR, which is in turn a perfluroropolyether having a mean molecular weight of about 6,000, a kinematic viscosity of about 1,000 cSt at 25° C., and neutral end groups.

test-piece 2
the piperonyl derivative of Example 1 in an amount equal to 30 g/m².

Both test-pieces were allowed to rest taking care to maintain the treated surfaces in a vertical position: respectively 15, 30 and 60 days after the treatment, from each test-piece there was cut a slice of 3 mm thickness, the cut having been carried out according to a perpendicular plane (and therefore in the direction of the protective agent penetration) to the face treated with the protective agent. Onto the slices so obtained there was deposited a very thin layer of metalic gold by using a conventional high-vacuum metalization device of the type "Galileo" V201r/00440. Since the metalization occurs only on the areas free from the presence of the protective agent, such method establishes the advancing front of the protective agent. The advance depths (expressed in mm) of the two protective agents on the test-pieces were as follows:

| days | 15 | 30 | 60 |
| --- | --- | --- | --- |
| test-piece 1 | 3.0 | 5.1 | 6.5 |
| test-piece 2 | 1.2 | 1.4 | 1.4 |

The results of this example show the higher residence (lower mobility), in the surface area of the sone material, of a protective agent functionalized according to the present invention as compared with a non-functionalized perfluoropolyether.

EXAMPLE 3

Example 1 was repeated using, as a protective agent, a compound of class II with benzyl end groups $C_6H_5-CH_2-$, prepared as is described in Example 1, and where instead of chloromethyl-1,2-methylenedioxybenzene, benzyl chloride was utilized, the linking group being $-CH_2O-$.

The mean molecular weight was equal to 2,200. The results obtained were analogous with those obtained in Example 1 for the absorption of $H_2O$ after 30 minutes.

EXAMPLE 4

Example 2 was repeated using the same protective agent as in Example 3.

The depths (expressed in mm) of the protective agent penetration on the test-pieces were as follows:

| days | depth (mm) |
|------|------------|
| 15   | 2.1        |
| 30   | 2.8        |
| 60   | 3.0        |

What is claimed is:

1. A process for processing marble, stones, tiles, cement, gypsum or wood and other article manufactured from such materials utilized in particular in building, from the degradation caused by atmospheric agents and pollutants, by applying onto the surface of said materials a protective agent selected from the class consisting of perfluoropolyethers having functionalized end groups and belonging to one of the following groups:

(I) $Rf-O(C_3F_6O)_m(CFXO)_n-CFX-Y-Z_p$
  where Rf is a perfluoroalkyl group having 1 to 3 carbon atoms; $(C_3F_6O)$ and $(CFXO)$ are oxyperfluoroalkylene units statistically distributed along the chain, and $X=F$ or $CF_3$;
  m and n are integers or $n=O$ (m always being $\neq O$) and
  m/n varies from 5 to 40 when $n \neq O$;
  p may be 1 or 2;
  the mean molecular weight varies from 500 to 10,000, and preferably from 900 to 6,000;
  Y is a divalent or trivalent organic linking radical;
  Z is a functional group capable of forming a chemical and/or physical bond with the above said material to be protected and is selected from the class consisting of:
    Z(1) equals a non-aromatic, non-fluorinated organic radical, free from active hydrogen atoms, containing two or more electron doublets-donor heteroatoms, or an aromatic radical, either containing or not containing heteroatomns, capable of giving rise to coordinate bonds or to charge-transfer bonds, thus causing adsorption phenomena kinds on the substrate;
    Z(2) equals $-CONR^2R^3$, $-COOR$, wherein R is H or an alkyl group with 1 to 8 carbon atoms, an aromatic or alkylaromatic group such as benzyl, where the aromatic groups may contain, as substituents, alkyl or polyethoxy groups,
    $R^2$ and $R^3$ are H or an alkyl group having 1 to 8 carbon atoms or a substituted phenyl group;

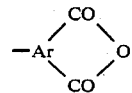

where Ar is an aromatic group;
    OH, NCO,

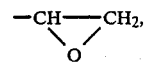

$-NHR$, $-COR$, $SiR_t(OR)_{3-t}$ with t ranging from 0 to 2, and R is the same as defined hereinabove;
    Z(3) is a radical of class Z(1) containing one or more substituents indicated in class Z(2), or a group containing unsaturation of the ethylenic polymerizable type;
    Z(4) is a radical of class Z(1) containing one or more of the substituents indicated in class Z(2);

(II) $AO-(C_2F_4O)_p(CF_2O)_q-A'$
  where units $(C_2F_4O)$ and $(CF_2O)$ are statistically distributed along the chain;
  p and q are integers such that p/q may vary from 5 to 0.3, and preferably from 2.5 to 0.7;
  $A'=-CFX-Y-Z_p$
  A is A' or a perfluoroalkyl having 1 to 3 carbon atoms;
  p, X, Y and Z are the same as defined hereinabove; the mean molecular weight varying from 1,000 to 20,000, and preferably from 1,800 to 8,000;

(III) perfluoropolyethereal compounds containing units $(C_3F_6O)$, $(C_2F_4O)$ and $(CFXO)$ statistically distributed along the chain with the indicated end groups A and A' as specified hereinbefore, and having a molecular weight ranging from 500 to 20,000;

(IV) difunctional or monofunctional perfluoropolyethereal compounds comprising the units:

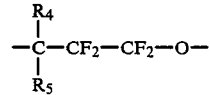

where $R_4$ and $R_5$ may be alike or different from each other and are selected from the class consisting of H, Cl and F, and where said units may be statistically distributed along the polymer chain; having a mean molecular weight ranging from 1,500 to 8,000; and wherein a fluorine atom or the perfluoromethylene units may be substituted by H, Cl or by perfluoroalkoxyl or perfluoroalkyl.

2. The process according to claim 1, in which Y is selected from the class consisting of $-CH_2O-$, $-CH_2-O-CH_2-$, $-CH_2(OCH_2CH_2)_g-$ (with g being an integer from 1 to 3), $-CF_2-$, $-CF_2O-$, $-CH_2-$, $-CONR-$, $-COO-$, $-COS-$, $-CO-$, —$CH_2NR$—, and —$CH_2S$—, where R is the same as defined in claim 1.

3. The process according to claim 1, in which Z(3) is selected from the class consisting of methacrylic, acrylic, cinnamic, vinyl, allyl, vinyl- and allylether radicals.

4. The process according to claim 1, in which the protective agent is a polymeric product obtained from products of classes I, II, III or IV in which groups Z are susceptible of being polymerized or polycondensed.

* * * * *